United States Patent [19]

Carsello

[11] Patent Number: 4,654,626
[45] Date of Patent: Mar. 31, 1987

[54] DIMMER SWITCH

[75] Inventor: John P. Carsello, Telford, Pa.

[73] Assignee: TBG Inc., New York, N.Y.

[21] Appl. No.: 764,755

[22] Filed: Aug. 12, 1985

[51] Int. Cl.$^4$ ...................... H01C 10/32; H01C 10/50
[52] U.S. Cl. .................................... 338/172; 338/198; 338/199; 338/191
[58] Field of Search ............... 338/199, 198, 172, 162, 338/166, 184, 191; 200/33 R

[56] References Cited

U.S. PATENT DOCUMENTS 3,743,999  7/1973  Miyashita ............................ 338/199
4,117,445  9/1978  Forman et al. ...................... 338/199

Primary Examiner—E. A. Goldberg
Assistant Examiner—M. M. Lateef
Attorney, Agent, or Firm—William R. Laney

[57] ABSTRACT

A dimmer switch which includes a rotary potentiometer mounted on a board secured to, and projecting normal from, a switch arm support bracket. The support bracket is secured to a face plate. A cover housing cooperates with the face plate to enclose the bracket and board and any circuit components, including the potentiometer, which are mounted on the board. A switch arm assembly carries trunnion studs pivotally supported in receiving trunnion sleeves forming part of the support bracket, and the switch arm assembly further includes a pivot lever projecting through an aperture in the face plate, and a toggle end to which is adjustably secured an arcuate gear segment. A projecting operating shaft of the rotary potentiometer carries a gear drivingly engaged by the gear segment on the switch arm.

15 Claims, 10 Drawing Figures

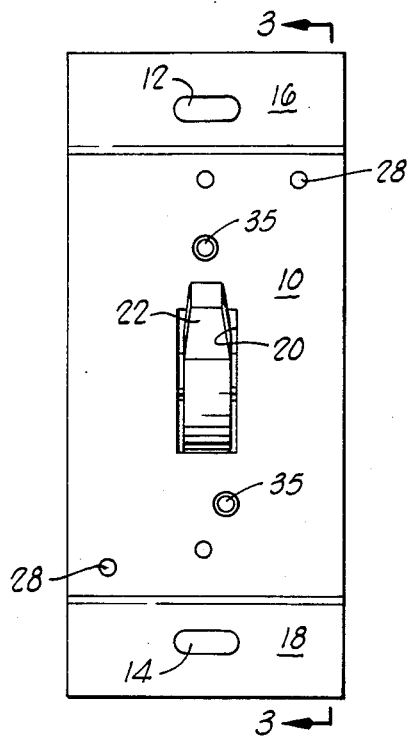
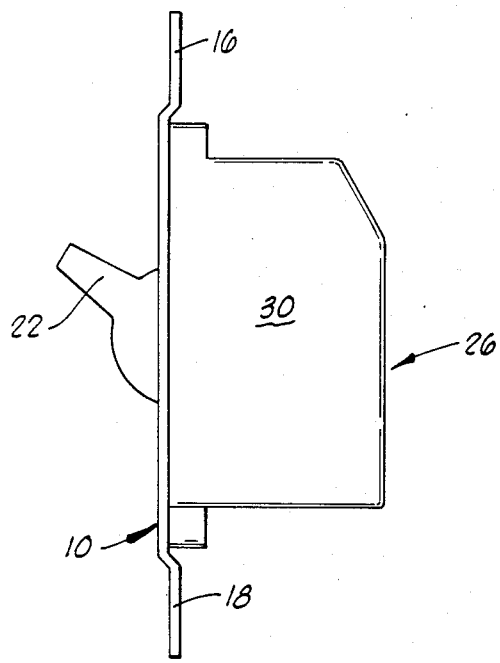
FIG.1
FIG.2
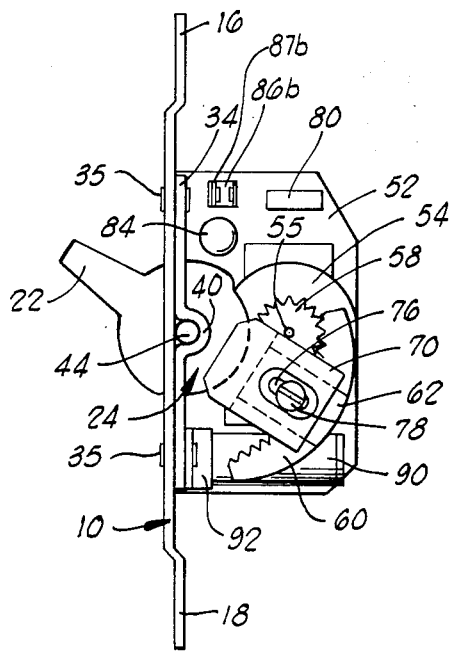
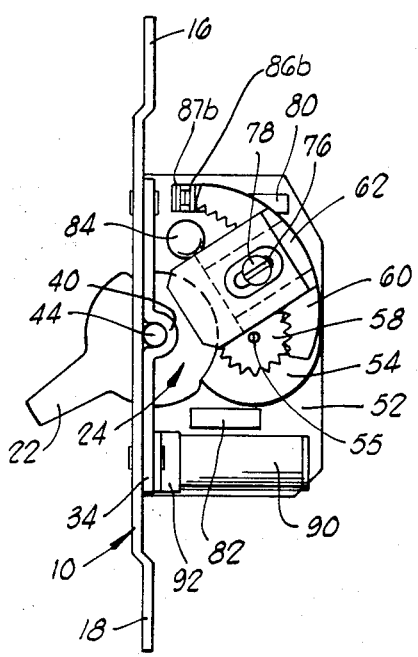
FIG.3
FIG.4

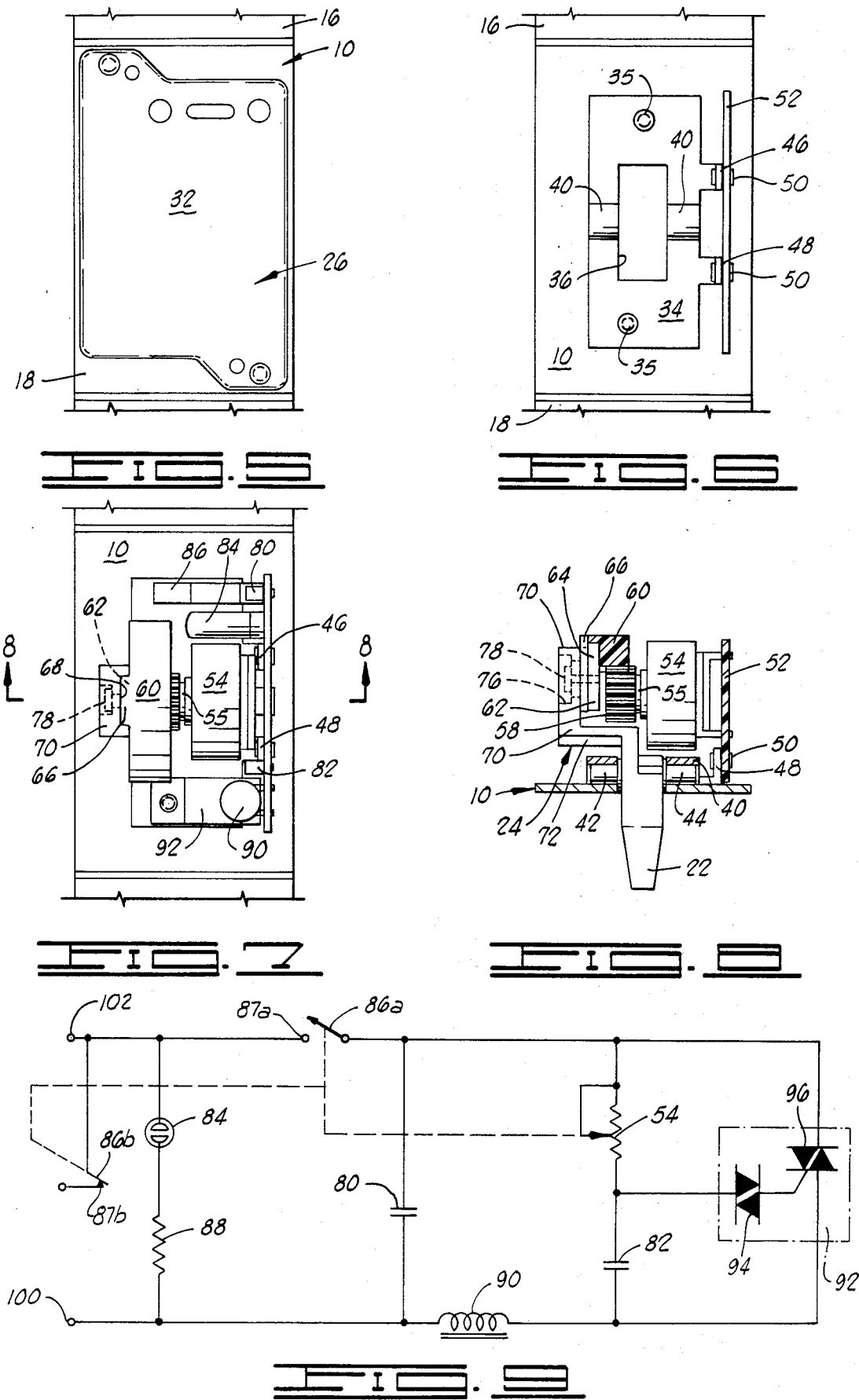

DIMMER SWITCH

FIELD OF THE INVENTION

This invention relates to power varying devices, and more particularly, to rotary potentiometer-type dimmer switches.

BACKGROUND OF THE INVENTION

Brief Description of the Prior Art

It is known to provide dimmer switches which control the power to a load by the use of a variable resistance or rotary potentiometer. In some of these dimmer switches, the variable resistance is operated by the use of a pivoted lever, toggle or pivoted operating handle. A structure of this general type is shown in West German Pat. No. 3,144,794 issued in 1981, and is used for dimming the panel lights of a motor vehicle. The dimmer switch employs a drive train between an externally protruding thumbwheel, manipulated by the vehicle operator for dimming the panel lights, and a rotating slide wiper of a rheostat which controls the current flow to the panel lights. The drive train includes a toothed gear segment which engages a pinion gear carried on the shaft of the rheostat. The gear segment is carried on a pivoted element which has a forked end. The slot at the forked end engages a peg carried on the side of the thumbwheel. As the thumbwheel is rotated, the peg moves in the slot to cause the forked element to swing or pivot, thereby translating the gear segment to drive the pinion wheel of the rheostat. This system makes no provision for adjusting the extent of engagement of the teeth on the gear segment with the teeth on the pinion wheel. This relationship is fixed.

U.S. Pat. No. 3,958,087 discloses a switching device which is operated by manipulation of a lever which protrudes from the switch housing, and is operatively connected to a rotatable, indicia carrying switch wheel. A gear segment is provided which meshes with a pinion gear carried on the switch wheel, so that as the gear segment is pivoted by pivotation of a projecting switch lever, the pinion wheel is caused to undergo rotation through a relatively large angle. U.S. Pat. No. 3,958,087 indicates that the toggle or lever portion of the disclosed switch can replace the thumbwheel used in certain types of prior art switching devices. As in German Pat. No. 3,144,794, however, the structure here described does not have any means for adjusting the degree of engagement of the gear segment with the pinion which it drives so as to provide a smooth, trouble-free action between the toggle arm and the rotatable switch wheel. Moreover, switching is accomplished incrementally by a series of discrete, intermittently engaging wiper contacts.

In the structure disclosed in U.S. Pat. No. 3,949,347, a rotary potentiometer is utilized to variably control the voltage to a load. The control circuit is mounted on a printed circuit plate. This dimmer switch is connected into a conventional three-way switching unit. The rotary potentiometer is in a conventional current control circuit for controlling the delay firing angle of a triac which is connected in series with the load.

U.S. Pat. No. 4,117,445 is directed to a rheostat or potentiometer which includes a resistive substrate across which a wiper is translated in response to the pivoting action of a toggle or pivot lever projecting from the housing in which the switch is located. A printed circuit board supports the resistive substrate and other circuit elements. The toggle lever does not function to drive the shaft of a rotary variable resistance.

Another type of toggle dimmer switch which mounts in an electrical wall box and employs a pivoted toggle or lever to cause a wiper to slide across a resistive contact element is disclosed in U.S. Pat. No. 3,310,768. The operating lever is preferably molded from an insulating material, and has integrally formed trunnions extending from a body portion in opposite directions. The trunnions are seated in trunnion seats in order to permit the operating member to be pivoted as a lever. A printed circuit board is employed for mounting the circuit components of the system.

In U.S. Pat. No. 3,990,033 issued in 1976, an electric power controller is disclosed in which conductive and resistive tracks are mounted in a common plate on a common circuit board, along with normally open and normally closed contact devices. The entire assembly is housed within a protective housing of insulating material. The conductive and resistive tracks mounted on the circuit board are contacted by a flexible bridging contact element which is carried on an arm of an internal controller member. The controller member includes a pivot shaft pivotally supported by the walls of the housing, and a manual control lever which projects through a slot in a mounting plate secured to, and covering, the open side of a protective housing. The actuator arm carries a flexible bridging contact element for sliding engagement with the conductive and resistive tracks. The circuitry does not employ a rotary variable resistor.

U.S. Pat. No. 4,085,399 issued in 1978 and assigned to Power Controls Corporation, discloses a pivoted power controller which, in its limit positions, engages a switch operating element to close or to open the power control circuit through switch contacts mounted on a circuit board enclosed within a housing. A resistive element mounted in the circuit and on the circuit board is engaged by a wiper on the controller during travel of the wiper between its limit positions. The power supplied to a load is thus varied. The wiper is actuated by means of a toggle arm or pivoted lever which projects through an opening in one side of the housing. The manual lever or toggle arm is pivotally mounted by means of trunnion shafts. In this switching structure, no rotary variable resistance is utilized.

GENERAL DESCRIPTION OF THE PRESENT INVENTION

The present invention relates to a toggle dimmer switch having a switch arm assembly which includes a toggle lever, and which is operated to cause rotation of a rotary potentiometer shaft. The toggle dimmer switch of the invention is reliable in operation, and is characterized in having an extended service life free from malfunction.

The dimmer switch includes a unique gearing system by which a full 300° of rotation of the rotary potentiometer can be achieved with a swing of less than 90° of the toggle lever portion of a switch arm assembly. The full range of dimming is thus attained with a resolution achieved by few, if any, previously known designs. The adjustable gear engagement feature forming a part of the actuating mechanism of the toggle dimmer switch also provides for the adjustable setting of the torque required to drive the toggle arm, thus assuring minimum frictional resistance to the interaction between the toggle arm and the potentiometer switch.

Broadly described, the dimmer switch of the invention includes the described rotary potentiometer mounted on a board which is preferably a printed circuit board. The board is secured and projects normal to a switch arm support bracket. This support bracket is secured to the rear side of a face plate of the sort used for mounting the entire dimmer switch in a wall box or other conventional location. A cover housing cooperates with the face plate to enclose the support bracket, the board, and circuit components, including the potentiometer, which are mounted on the board.

A switch arm assembly utilized for accomplishing power reduction to the load carries trunnion studs which pivotally support the switch arm assembly in receiving trunnion sleeves forming a part of the support bracket. The switch arm assembly includes a toggle lever which projects through aligned apertures in the support bracket and in the face plate. The switch arm assembly also includes a toggle end to which is adjustably secured an arcuate gear segment. This gear segment can be moved radially with respect to the rotational axis of the shaft of the rotary potentiometer as a result of its adjustable securement to the remaining portion of the switch arm assembly. The gear segment forming a part of the switch arm assembly cooperates, during operation of the dimmer switch, with a pinion gear carried on the operating shaft of the rotary potentiometer.

An important object of the present invention is to provide a toggle dimmer switch which is highly reliable in both its electrical and mechanical functions, and which is characterized in having a long and trouble-free operating life.

A further, and more specific, object of the invention is to provide a unique and innovative gearing system by which a rotary potentiometer is caused to undergo rotary variation in its resistance characteristic as a result of limited pivoting movement of a toggle arm. A switch arm assembly which includes the toggle lever further includes a gear segment which is adjustably mounted within the switch arm assembly so that the torque by which the shaft of the potentiometer is driven in rotation can be varied to assure a smooth operating action.

A further object of the invention is to provide a toggle dimmer switch which includes an enclosed circuit board which affords flexibility in quickly and easily adapting the device to different types of circuitry by the simple expedient of adding components to the printed circuit board, according to the contemplated use of the device, or the application in which it is to be employed.

Additional objects and advantages of the invention will become apparent as the following detailed description of the invention is read in conjunction with the accompaning drawings which illustrate a preferred embodiment of the invention.

GENERAL DESCRIPTION OF THE DRAWINGS

FIG. 1 is a front elevation view of the dimmer switch of the invention as it would appear when facing a wall in which the switch box carrying the dimmer switch is mounted.

FIG. 2 is a side elevation view of the dimmer switch of the invention.

FIG. 3 is a sectional view taken along line 3—3 of FIG. 1. One of the operative positions of the switch is here illustrated.

FIG. 4 is a view similar to FIG. 3, but illustrating a second operative position of the switch after the toggle lever or pivot lever has been pivoted during use of the dimmer switch.

FIG. 5 is a rear elevation view of a cover housing which cooperates with the dimmer switch face plate to enclose some of the circuit components of the switch, including a rotary potentiometer.

FIG. 6 is a rear elevation view of the dimmer switch with the cover removed, and illustrating only a switch arm support bracket and a circuit component mounting board, both attached to the face plate.

FIG. 7 is a rear elevation view of the dimmer switch with the cover removed so as to illustrate a switch arm support bracket, a switch arm assembly, and, in the illustrated preferred embodiment, a printed circuit board to which are mounted various components of the electrical circuit. In the background can be seen the backside of the face plate.

FIG. 8 is a sectional view taken along line 8—8 of FIG. 7, and showing the cooperating relationship between the switch arm assembly, including the associated arcuate gear segment carried thereon, and the rotary potentiometer, as the two are mounted to the switch arm support bracket, and to the circuit board, respectively.

FIG. 9 is a circuit diagram illustrating the dimmer switch circuit.

DETAILED DESCRIPTION OF A PREFERRED EMBODIMENT OF THE INVENTION

Figure 10:
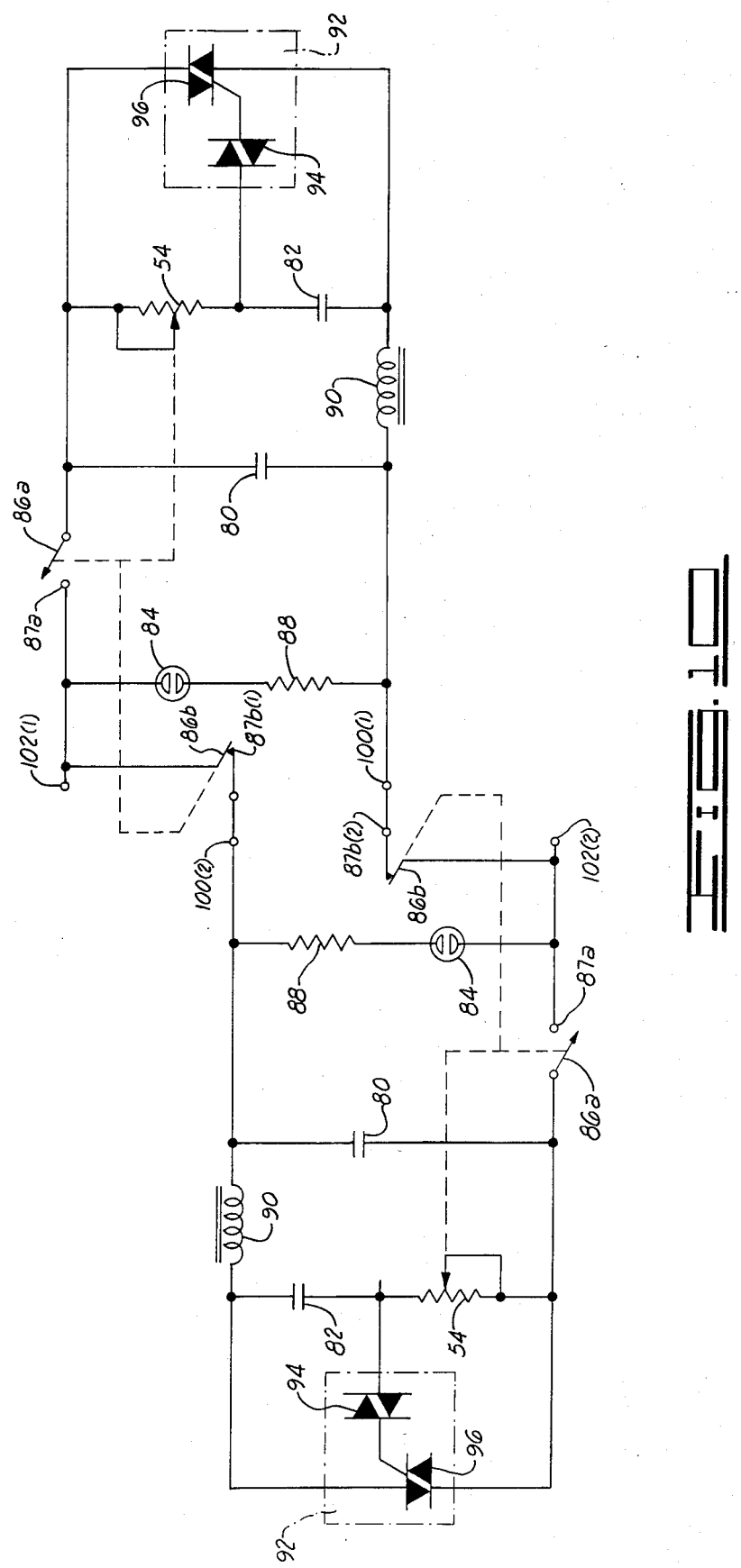
FIG. 10 is a circuit diagram illustrating the manner in which two identical toggle dimmer switches are interconnected in a three-way installation.

Referring initially to FIG. 1 of the drawings, the dimmer switch of the invention there illustrated includes a heat-sink or face plate 10. The face plate 10 is used for mounting the dimmer switch in a wall in conventional fashion. For this purpose, and to allow adjustment to plumb the face plate 10 and the switch carried thereon, a pair of elongated fastener holes 12 and 14 are provided centrally in a pair of end flange portions 16 and 18 of the face plate. The face plate 10 also defines a rectangular central aperture 20. The central aperture 20 accommodates a toggle lever portion 22 of a switch arm assembly, designated generally by reference numeral 24 (see FIGS. 3, 4 and 8). A hollow cover housing 26 is secured to the back side of the face plate 10 by suitable fastening devices extended through holes 28 formed in the face plate as shown in FIG. 1. The cover housing 26 includes a pair of opposed, parallel side walls 30 and a back wall 32 (see FIG. 5).

The purpose of the cover housing 26 is to enclose and protect certain parts of the electrical circuitry, and moving parts of the switch mechanism. Some of these are illustrated in FIGS. 3, 4, 7 and 8. For the purpose of supporting these parts in proper relation to each other within the housing 26, a centrally apertured support bracket 34 is secured to the rear side of the face plate 10 by rivets 35 or other suitable fastening devices. The support bracket 34 has a major plane which extends parallel to the major plane of the face plate 10, and the bracket defines a rectangular central opening 36 which is aligned with the aperture 20 in the face plate. On opposite sides of the rectangular central opening 36 are a pair of trunnion sleeves 40. The trunnion sleeves 40 are formed or defined by a pair of opposed, aligned, semi-cylindrical dimples on opposite sides of the support bracket 34. The switch arm assembly 24 has a pair of aligned, oppositely projecting trunnion shafts 42 and 44 which project from the base of the toggle lever portion 22, and are pivotally supported in the trunnion sleeves 40 as best illustrated in FIG. 4 and 8.

The centrally apertured support bracket 34 has a pair of laterally projecting, upturned toes 46 and 48 which have end portions extending normal to the major planes of the support bracket and the face plate 10. As shown in FIGS. 6 and 8, the upturned portions of the toes 46 and 48 are apertured to permit rivets 50 or other suitable fastening devices to be used for securing a printed circuit boarde 52 to the toes. The printed circuit board 52 thus extends substantially normal to the face plate 10, as shown in FIGS. 6 and 8. In FIG. 6, the printed circuit board 52 is illustrated without showing any of the circuit elements mounted thereon in order to clearly illustrate the relationship of the board to the support bracket 34 and to the face plate 10. As shown in FIG. 5, the cover housing 26 covers the support bracket 34, the printed circuit board 52 and the several circuit components carried on the circuit board.

A rotary potentiometer 54 is secured to the printed circuit board 52 in the position illustrated in FIGS. 3, 4, 7 and 8. The shaft 55 of the rotary potentiometer carries a pinion gear 58 at its outer end. For the purpose of varying the resistance of the potentiometer 54 by rotating the pinion gear 58 keyed to its shaft, a gear segment 60 carrying teeth which mate with the teeth of the pinion gear 58 is utilized. The gear segment 60 is a part of the switch arm assembly 24 to which reference has previously been made. The gear segment 60 is of a length such that it can cause the pinion gear 58 to rotate through at least 300° as the gear segment is translated thereacross.

The gear segment 60 has a mounting plate 62 secured thereto or, in a preferred embodiment of the invention, molded integrally therewith. The mounting plate 62 includes a relatively large, rectangularly-shaped facing portion 64 which is adjacent the gear segment 60, and a male slide plate key 66. The male slide plate key is dimensioned to slide in a complementary, rectangularly cross-sectioned keyway slot 68 which is formed in a gear plate 70 forming a part of the switch arm assembly 24. The gear plate 70 is connected by an offset step 72 to the base of the toggle lever portion 22 of the switch arm assembly 24.

In referring to FIGS. 3 and 4, it will be noted that the gear plate 70 defines an elongated or oval-shaped, elongated, fastener receiving slot or opening 76 which is located on the opposite of the gear plate from the keyway slot 68. The opening 76 functions to receive the shank of a fastener 78 which is extended through the opening and into an aperture formed through the center of the mounting plate 62. The mounting plate 62 and the gear segment 60 carried thereby can thus be positionally adjusted radially toward and away from the pivotal axis of the switch arm 24 by sliding the loosened fastener 78 in a radial direction in the opening 76 until it is at the proper location and then re-tightening it.

In a preferred embodiment of the invention, the toggle lever portion 22, base portion, offset step 72 and gear plate 70 are molded as a unitary synthetic resin element.

The described unique gearing system provides a full 300° of rotation of the rotary potentiometer 54 for less than a 90° swing of the toggle lever portion 22 of the switch arm assembly 24, thus facilitating the full range of dimming with a resolution which is not achieved by known prior art devices.

The adjustable gear segment engagement with the pinion gear 58, which is possible by reason of the elongated slot 76 accommodating the screw or fastener 78, provides the advantage of allowing the torque required to drive the toggle arm and the potentiometer pinion gear to be adjusted so as to achieve a smooth action between the toggle arm and the rotary potentiometer.

In addition to the rotary potentiometer 54, the dimming circuit in which the potentiometer 54 is located includes other components which are mounted on the printed circuit board 52. Thus, two capacitors 80 and 82 are included in the dimmer switch electrical circuit illustrated in FIG. 9, and are secured to the printed circuit board at the locations specified thereon as illustrated in FIGS. 3, 4 and 7. A choke 90 is also connected in the circuit as shown in FIG. 9, and is mounted on the circuit board 52 at the location shown in FIGS. 3, 4 and 7. Additionally, a quadrac assembly 92 is mounted in the circuit as shown in FIG. 9, and includes a diac 94 and a triac 96. The triggering or gating input of the quadrac 92 is connected to the junction between the potentiometer 54 and the capacitor 82 so that conduction of the triac 96 is responsive to the resistive setting of the potentiometer 54 in a manner known to the art. These components are assembled in the preferred embodiment in the manner shown in FIG. 9, and they are electrically operable in a manner as is known to the art and as is apparent from FIG. 9.

Also carried on the printed circuit board 52 is a neon glow light 84 which functions to illuminate or back light the face plate 10, and particularly the projecting lever portion 22 of the switch arm assembly 24. Also mounted on the printed circuit board 52 is a limiting resistor 88 which is connected in series with the neon light 84.

The mechanical operation by which an alternating current power source, connected to a terminal 100, is applied to a load, connected to a load terminal 102, includes actuating the lever 22, thereby moving the connected gear segment 60 to actuate one or more subsequently described switches and to move the wiper arm of the potentiometer 54, which controls the operation of the quadrac 92 and thus the application of the power source to the load connected in series with the triac 96. For the embodiment shown in FIGS. 1–8, movement of the lever 22, and thus of the segment 60, to one of its extreme positions (specifically, the "off" position) simultaneously or substantially simultaneously opens an internal on/off switch contained within the potentiometer 54 and closes a pair or contacts defining part of a single-pole single-throw switch. In FIG. 9, the internal switch of the potentiometer 54 is represented by a movable switch member 86a and a stationary contact 87a, and the single-pole single-throw switch is represented by a movable switch member 86b and a stationary contact 87b. FIG. 9 illustrates the positions of the switch members 86a, 86b when the gear segment 60 is in its off position illustrated in FIG. 4. In this off position, the internal switch member 86a is open, thereby disconnecting the dimming circuitry shown in FIG. 9 from the load terminal 102 and the load connected thereto; and the switch member 86b is closed against the contact 87b (see also FIG. 4), thereby connecting the load terminal 102 to another switch (not shown) for three-way switching operation as known to the art. This circuitry arrangement thus permits a second toggle dimmer switch to be then connected to the load at this time, and control can be had from a location remote from the first illustrated dimmer switch. When the lever 22 is moved upwardly, thereby moving the gear segment 60 to an "on" position, such as illustrated in FIG. 3, the switch member 86a closes against the contact 87a and the switch member 86b moves away from the contact 87b as illustrated in FIG. 3.

In an alternate embodiment the potentiometer 54 is of a type which does not integrally incorporate an on/off switch of the type just described. In this alternate embodiment, an external single-pole single-throw switch can be used to implement the switch member 86a and contact 87a schematically illustrated in FIG. 9. If a three-way function is desired, a single-pole double-throw switch can be used instead. One embodiment of such a single-pole double-throw switch has a central movable switch member spaced between two stationary contact members. With reference to the schematic drawing of FIG. 9, the central movable switch member is a single element serving the function of both switch members 86a, 86b (hereinafter referred to as switch member 86a,b). The two switch contact members of such a single-pole double-throw switch serve the functions of contacts 87a, 87b. In this embodiment, the single-pole double-throw switch is physically mounted in the location of the switch shown in FIGS. 3 and 4 containing the elements 86b, 87b. When this type of switch is used, the switch member 86a,b is closed against the corresponding contact 87a when the gear segment 60 is in an "on" position, wherein the gear segment 60 does not engage the switch element 86a,b. Such a position is illustrated in FIG. 3, but with the described single-pole double-throw switch replacing the single-pole single-throw switch having elements 86b and 87b actually illustrated therein. When the gear segment 60 is at such an on position, the contact of the single-pole double-throw switch corresponding to the contact 87b is open; however, when the gear segment 60 is moved to the off position, such as is shown in FIG. 4, the segment 60 engages the movable switch member 86a,b, moving it out of engagement with the corresponding contact 87a and into engagement with the corresponding contact 87b. This action disconnects the load connected to the terminal 102 from the local dimming circuit, but connects the load to a remote switch for three-way operation.

When the switch member 86a (or the switch member 86a,b for a single-pole double-throw switch) is closed against the contact 87a, varying the potentiometer 54 by moving the lever 22 varies the operation of the triac 96 in a manner as known to the art, thereby variably controlling current to the load connected in series with the triac 96 through the load terminal 102. For example, such variation controls the intensity of a light connected to the terminal 102 as the load. Generally, pivotation of the toggle lever 22 downwardly toward the "off" limit position illustrated in FIG. 4 will increase the resistance of the potentiometer 54 toward a maximum resistance value, at which point the switch elements 86a, 87a are opened to disconnect the dimming circuit from the load. Conversely, pivotation of the toggle lever 22 upwardly will decrease the resistance of the potentiometer 54 to a minimum value, at which point full power passes to the load connected to the terminal 102.

As previously mentioned, the present invention can be used in a three-way installation. For example, such installation can be with two units of the present invention or with one unit of the present invention and a standard three-way snap switch of a type as known in the art. Such three-way operation will be briefly described first with reference to a circuit illustrated in FIG. 10 as using two toggle dimmer switch units of the present invention, one of which will be noted by the numeral 1 in parentheses and the other of which will be noted by the numeral 2 in parentheses, with these parenthetical numerals appended to the reference numerals shown in FIG. 9.

To construct a three-way circuit using two units of the present invention the load terminal 102(1) is connected to the load. The terminal 100(1) is connected to the terminal of the contact 87b(2), and the terminal if the contact 87b(1) is connected to the terminal 100(2). The load terminal 102(2) of the second unit of the present invention is connected to the power source.

Once the two units of the present invention are thus connected, the two units can be used as standard function three-way switches or as dimmer switches from either location; however, full range dimming can occur from either switch location only when the opposite dimmer switch is in the "off" position. This is apparent upon reviewing FIG. 9 and considering the aforementioned construction, because when both units of the present invention are concurrently in the "on" position, the load will not be energized due to the switch members 86b(a) and 86b(2) both being in their open positions whereby the load, connected to terminal 102(1), is disconnected from the power source, connected to the terminal 102(2).

When the two units of the present invention are oppositely positioned in respective "on" and "off" positions whereby one of the units has dimming control over the load, such capability in that unit will be indicated by the illuminated toggle. That is, the light 84 is illuminated in that switch which is positioned so that the corresponding potentiometer 54 of that unit can be adjusted to control the energization of the load. In such a configuration wherein one of the units is providing dimming control to the load, that unit can be controlled to preset the light intensity (if the load is a light), whereupon the opposite unit of the present invention can be used to turn the light on and off to that desired intensity.

In the configuration wherein a standard three-way snap switch is used with a single unit of the present invention, such a three-way switch can be used to replace the first unit of the first described three-way configuration. In this alternate configuration, the common terminal of the three-way switch is connected to the load and the remaining two terminals are respectively connected to the terminal 100(2) and the terminal of the contact 87b(2). In this configuration, full range dimming is available when the three-way switch is in the full "on" position. In such a position the unit of the present invention can be used to fully control the load or it can be present whereupon the three-way switch can be used to turn the load on and off to the preset magnitude.

Although a preferred embodiment of the invention has been herein described in order to afford illustration of the principles which underlie the invention, it will be understood that various changes and innovations in the illustrated structure can be effected without departure from these principles. Changes and innovations of this type are therefore deemed to be circumscribed by the spirit and scope of the invention, except as the same are necessarily limited by the appended claims, or reasonable equivalents thereof.

What is claimed is:

1. A dimmer switch comprising:
   a rotary potentiometer having a projecting rotary shaft for rotatably varying the resistance of the potentiometer;
   a pinion gear mounted on, and rotatable with, said shaft;
   board means supporting said potentiometer;
   a switch arm assembly for operatively engaging said pinion gear to vary the resistance of the potentiometer, said switch arm assembly including:
     a toggle lever portion;
     a base portion connected to said toggle lever portion;
     a gear plate connected to said base portion; and
     a gear segment movably and adjustably connected to said gear plate and adjustably and drivingly engaging said pinion gear for driving said pinion gear in rotation when said toggle lever portion is pivoted;
   means pivotably supporting said switch arm assembly in a location adjacent said pinion gear to facilitate continuous engagement between said gear segment and said pinion gear as said switch arm assembly is pivoted about a pivotal axis defined by said supporting means; and
   housing means enclosing said board means, potentiometer, pinion gear, supporting means and a portion of said switch arm assembly.

2. A dimmer switch as defined in claim 1 wherein said housing means comprises:
   a face plate having an opening therethrough facilitating the projection of said toggle lever portion through said opening to a position outside said housing means; and
   a hollow cover housing connected to said face plate and cooperating therewith to enclose said board means, potentiometer, pinion gear, supporting means and a portion of said switch arm assembly.

3. A dimmer switch as defined in claim 1 wherein said switch arm assembly further includes:
   a pair of trunnion shafts projecting from said base portion, and wherein said supporting means is a support bracket having a pair of trunnion sleeves disposed on opposite sides of an opening therethrough, and pivotally receiving said trunnion shafts in said trunnion sleeves, said switch arm base portion being positioned at least partially in said opening.

4. A dimmer switch as defined in claim 1 wherein said board means is a printed circuit board having electrical circuit elements, including said potentiometer, mounted thereon.

5. A dimmer switch as defined in claim 1 wherein said switch arm assembly further includes:
   a pair of trunnion shafts connected to, and projecting from opposite sides of, said base portion;
   an offset step interconnecting said base portion and said gear plate; and
   a mounting plate secured to said gear segment and including a key portion slidably and adjustably connected to said gear plate.

6. A dimmer switch as defined in claim 1 and further characterized as including an on-off switch assembly mounted on said board means at a location in the path of movement of said gear segment whereby pivotation of said toggle lever portion is effective, by pivoting said gear segment against said on-off switch assembly to throw said on-off switch assembly.

7. A dimmer switch as defined in claim 1 wherein said rotary potentiometer includes an on-off switch which is opened at one of the rotational limits of travel of said projecting rotary shaft.

8. A dimmer switch as defined in claim 3 wherein said toggle lever portion, said base portion, said turnnion shafts and said gear plate are a unitary synthetic resin element.

9. A dimmer switch as defined in claim 2 wherein said switch arm assembly further includes:
   a pair of trunnion shafts projecting from said base portion;
   and wherein said supporting means is a support bracket secured to one side of said face plate, and including means for pivotally receiving said trunnion shafts.

10. A dimmer switch as defined in claim 9 wherein said support bracket has a central opening therethrough aligned with the opening through said face plate, and wherein said means for pivotally receiving said trunnion shafts comprises a pair of trunnion sleeves carried on said support bracket.

11. A dimmer switch as defined in claim 5 wherein said means pivotally supporting said switch arm assembly includes a pair of of sleeves carried on said housing means and pivotally receiving said trunnion shafts.

12. A dimmer switch as defined in claim 11 and further characterized as including an on-off switch assembly mounted on said board means at a location in the path of movement of said gear segment whereby pivotation of said toggle lever portion is effective, by pivoting said gear segment against said on-off switch assembly to throw said on-off switch assembly.

13. A dimmer switch comprising:
   a rotary potentiometer having a movable portion movable to vary the resistance thereof;
   gear means connected to said rotary potentiometer for varying the resistance of the potentiometer, said gear means including:
     a toggle lever portion pivotable about a pivotal axis;
     a base portion connected to said toggle lever portion on one side of said pivotal axis;
     a gear plate connected to said base portion, said toggle lever, base portion and gear plate being molded as a synthetic resin integral unit, said gear plate defining a slot in one side thereof extending radially outwardly from the pivotal axis of said toggle lever portion;
     a gear segment drivingly engaging said movable portion of said rotary potentiometer for driving said movable portion in rotation when said gear segment is moved;
     a mounting plate connected to said gear segment and including male key means slidably mounted in the slot in said gear plate for radial sliding movement toward and away from said pivotal axis; and
     means for adjustably fixing the position of said mounting plate relative to said gear plate and relative to said potentiometer; and
   means pivotally supporting said toggle lever portion and said base portion for pivotation about a pivotal axis to thereby cause rotation of said gear segment about said pivotal axis, said pivotal supporting means including an enclosure enclosing said potentiometer and all of said gear means except a part of said toggle lever portion.

14. A dimmer switch as defined in claim 13 wherein said means for adjustably fixing the position of said mounting plate comprises:

an elongated opening through said gear plate on the opposite of the gear plate from said radially outwardly extending slot, and aligned with said radially outwardly extending slot; and a headed fastener having a shank extending through said elongated opening, and through said slot and into said mounting plate to retain said male key means in the slot in said gear plate.

15. A dimmer switch as defined in claim 13 wherein said means for pivotally supporting said toggle lever portion and base portion comprises:

plate means pivotally supporting said toggle lever portion and base portion; and a cover housing constituting said enclosure.

* * * * *